United States Patent
Olsen

[11] 3,900,119
[45] Aug. 19, 1975

[54] VEHICLE STABILIZED FOR HEAVY DUTY USE

[75] Inventor: Harold L. Olsen, Waukegan, Ill.

[73] Assignee: Olsen Axle & Equipment Company Inc., Waukegan, Ill.

[22] Filed: Feb. 7, 1973

[21] Appl. No.: 330,420

Related U.S. Application Data

[63] Continuation-in-part of Ser. No. 192,085, Oct. 26, 1971, abandoned.

[52] U.S. Cl. ............ 214/86 A; 212/145; 280/81 R; 280/150 A; 280/405 R
[51] Int. Cl. .......................................... B60p 1/54
[58] Field of Search ........ 214/86 R, 86 A; 280/405, 280/423 R, 81, 150 A; 212/8, 35, 65, 145; 254/86 H, 139.1

[56] References Cited
UNITED STATES PATENTS

| | | | |
|---|---|---|---|
| 2,283,443 | 5/1942 | Klein | 214/86 A |
| 2,818,984 | 1/1958 | Nims | 214/86 A |
| 2,902,289 | 9/1959 | Mendez | 280/423 R |
| 2,956,691 | 10/1960 | Fangman | 212/35 R |
| 2,974,976 | 3/1961 | Lyall | 280/405 R |
| 3,207,338 | 9/1965 | Felburn | 214/DIG. 1 |
| 3,257,124 | 6/1966 | North | 280/423 R |
| 3,458,068 | 7/1969 | Scott | 214/86 A |
| 3,752,496 | 8/1973 | Meinecke, Jr. | 280/81 R |

Primary Examiner—Robert J. Spar
Assistant Examiner—Donald W. Underwood
Attorney, Agent, or Firm—Charles H. Thomas, Jr.

[57] ABSTRACT

Retractable auxiliary wheels positioned behind the rear wheels of a conventional two axle motor vehicle for increasing the load bearing capability of vehicles designed for moderate load bearing capacity. The auxiliary wheels are positionable in a raised load free position or may be locked in a lowered, load bearing position.

8 Claims, 9 Drawing Figures

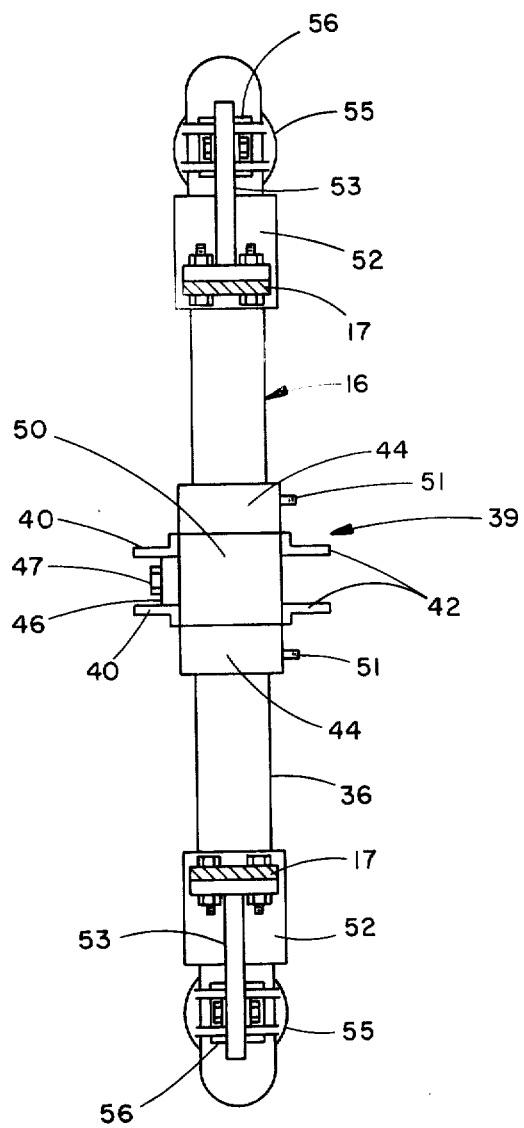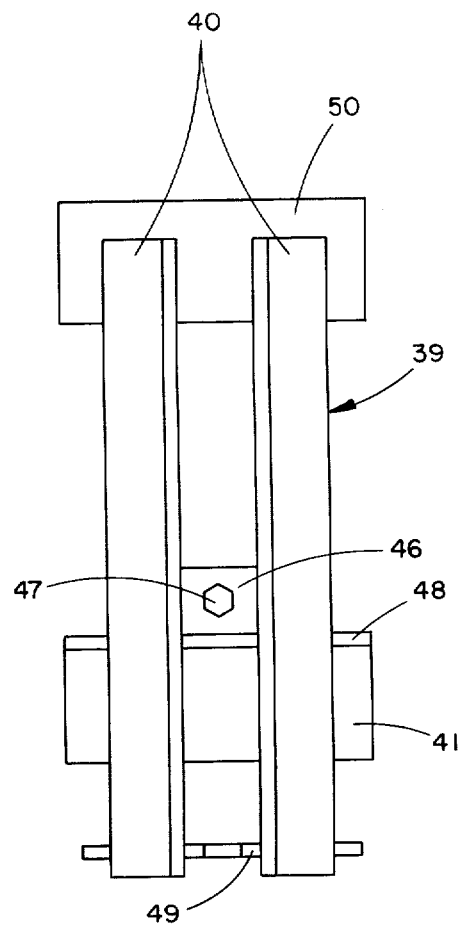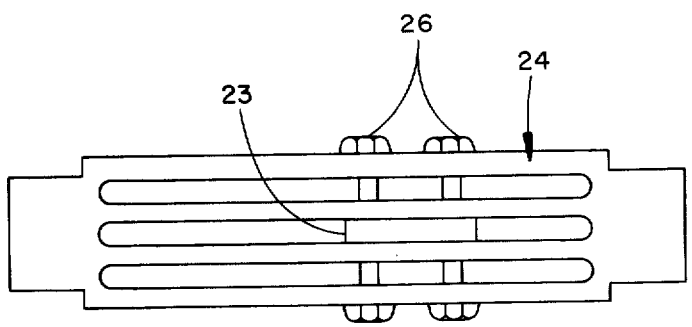
FIG. 4
FIG. 5
FIG. 6

VEHICLE STABILIZED FOR HEAVY DUTY USE

This application is a continuation in part of U.S. Patent Application Ser. No. 192,085, filed on Oct. 26, 1971 now abandoned.

This invention relates to an improvement in motor vehicles having a moderate load bearing capability. Retractable auxiliary wheels may alternatively be automatically positioned in a raised, load free position, or in a lowered, load bearing position.

BACKGROUND OF THE INVENTION

In many situations, vehicles having a light or moderate load bearing capability are sufficient to perform most of the required vehicular tasks. For example, conventional half ton pick up trucks are typically owned and used at many service stations, garages, farms, retail outlets of all types, and other commercial enterprises. In addition most households own passenger cars or half ton pick up trucks, and these vehicles are used both for daily functions and for recurring recreational functions. While these vehicles are suitable for most of the duties to be performed, instances occasionally or frequently arise where their load handling capability is insufficient. While such instances do occur, they do not justify the expense of a larger, heavier duty vehicle. Also, even if a heavier duty vehicle is justified, the vehicle owner usually still requires the advantages of speed and handling present in a lighter duty vehicle, and the duplicate expense of two vehicles is normally an intolerable economic burden.

SUMMARY OF THE INVENTION

Accordingly, it is an object of the present invention to modify conventional vehicles normally operable with two permanent axles to increase their load bearing capacity. Half ton pick up trucks, modified according to this invention, can be used to carry exceptionally heavy loads at high highway speeds or over rough roads which would otherwise require the use of a truck having three or more axles.

In one particular application, a truck having two permanent axles can be modified with the auxiliary wheels and axle of this invention and provided with a portable towing unit to enable it to tow disabled vehicles which substantially outweigh it. For example, a half ton pick up truck modified according to this invention and provided with the towing unit of this invention can tow a disabled bus and can tow a disabled luxury passenger car at normal traffic speeds.

In another application, a half ton pick up truck modified according to this invention can be used to haul a camper unit mounted thereon at expressway speeds without the sway and handling difficulty which would otherwise occur. This same advantage is gained when conventional passenger cars, modified according to this invention, are used to tow boats and trailers of other types.

Another advantage is that a vehicle modified according to this invention can be transformed in a matter of seconds into a tracked vehicle while the vehicle is at rest and without requiring the use of a jack to raise any of the permanent wheels off the ground. Such a vehicle thereby gains access to sandy and snowy areas in which a conventional vehicle would immediately become mired.

In addition, the advantages of this invention can be obtained at only a fraction of the cost of replacing a two-axled vehicle with a heavier duty vehicle and without sacrificing any of the advantages of the two-axled vehicle.

BRIEF DESCRIPTION OF THE INVENTION

In a broad aspect, this invention is, in a motor vehicle having a frame and having permanent front and rear axles and designed for operation with only two permanent parallel axles and supported by wheels on the ends of said permanent axles, the improvement comprising a mounting assembly rotatably connected to the vehicle frame behind the rear axles for rotation about a mounting axis above and to the rear of said rear axle, an auxiliary axle with auxiliary wheels mounted on the ends thereof carried by said mounting assembly and rotatable about said mounting axis between a lowered, load bearing position and a raised, load free position, actuating means connected to the vehicle frame and to the mounting means for moving the auxiliary axle between the lowered and raised positions, and locking means for locking the auxiliary axle in the lowered, load bearing position.

DETAILED DESCRIPTION OF THE INVENTION

The aforementioned and other advantages as well as the preferred manner of construction of this invention are readily apparent from the accompanying illustrations in which:

FIG. 4 is an isolated view of the mounting axis member of FIG. 1.

FIG. 5 is an isolated end view of the mounting assembly of FIGS. 1 and 2.

FIG. 6 is an isolated plan view of the actuating member base of FIG. 1.

Figure 1:
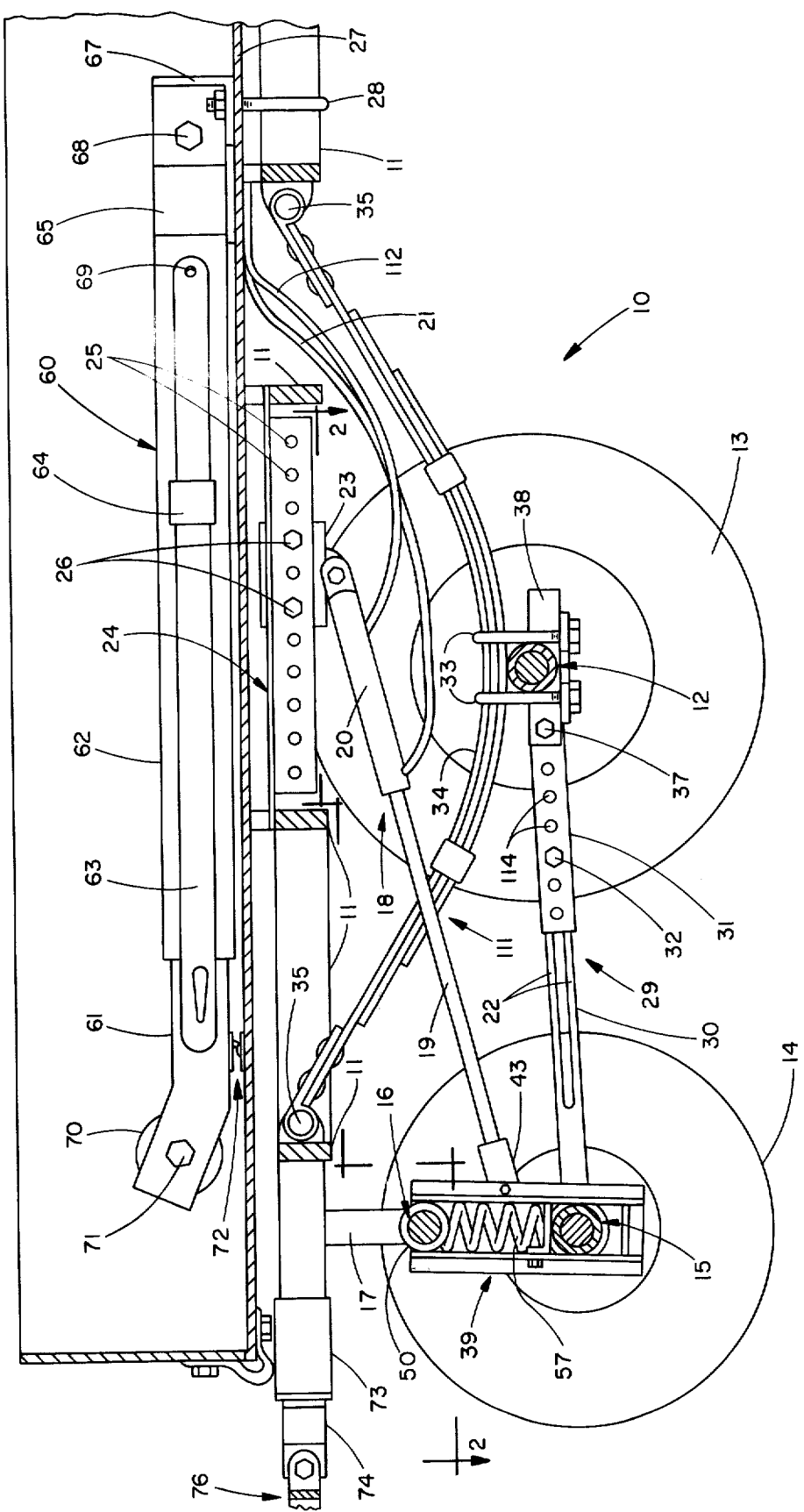
FIG. 1 is a sectional elevational view through a vehicle modified according to this invention taken along the lines 1—1 of FIG. 2.

Referring now to FIG. 1 there is shown the rear portion of a half ton pick up truck 10 having a frame 11 and having a permanent front axle (not shown) and a permanent rear axle 12. The rear wheels 13, support the rear of the truck 10 by means of leaf springs 34 connected to frame 11 at spring joints 35. U-bolts 33 pass through the fastening assembly 38 and secure the leaf springs 34 to the rear axle 12. The flat bed 27 of the truck 10 is carried on the frame 11.

The improvement of this invention for increasing the load carrying capability of the truck 10 resides in the mounting axis 16 the mounting assembly 39, the auxiliary axle 15 with auxiliary wheels 14 mounted on the ends thereof, an actuating means 18, and the locking means 29. The mounting axis 16 is located behind rear axle 12 and is comprised of a cylindrical metal bar 36 parallel to the rear axle 12 with circumferential fittings 52 having brackets 53 welded thereto for attachment to frame 11 by means of frame connecting links 17 as illustrated in FIG. 4. Frame connecting links 17 are securely connected to brackets 53, in the manner most appropriate for the vehicle involved. Guides 56 are interposed in sliding contact with bar 36 and are bolted to outwardly extending portions of the guides 53. Straps of the spring brackets 55 pass over the guides 56.

Mounting assembly 39 is rotatably connected to the vehicle frame at the mounting axis 16. Mounting assembly 39 includes a sleeve 50 rotatable about metal bar 36 and forward angles 42 and rear angles 40 extending downward therefrom, as illustrated in FIGS. 4 and 5. Retaining sleeves 44 positioned on either side of sleeve 50 are fastened to metal bar 36 by set screws 51, thereby preventing lateral movement of mounting assembly 39. Mounting assembly 39 is rotatable about the mounting axis 16 and carries an auxiliary axle 15, which is thereby also rotatable about the mounting axis 16 and which may alternatively be positioned in the lowered load bearing position of FIG. 1, and a raised, load free position, where the auxiliary axle would move counter clockwise in FIG. 1 to a position roughly level with and forward from mounting axis 16.

Auxiliary axle 15 is spring biased away from mounting axis 16, by two coil springs 57 which are seated in spring brackets 55 attached to both the metal bar 36 and the auxiliary axle 15. Sleeve 41 is rigidly fastened to auxiliary axle 15 by set screws 51 and is encompassed within mounting assembly 39. The stabilizing frame 49 of mounting assembly 39 limits the movement of auxiliary axle 15 away from mounting axis 16 by limiting the movement of sleeve 41 within mounting assembly 39.

Figure 2:
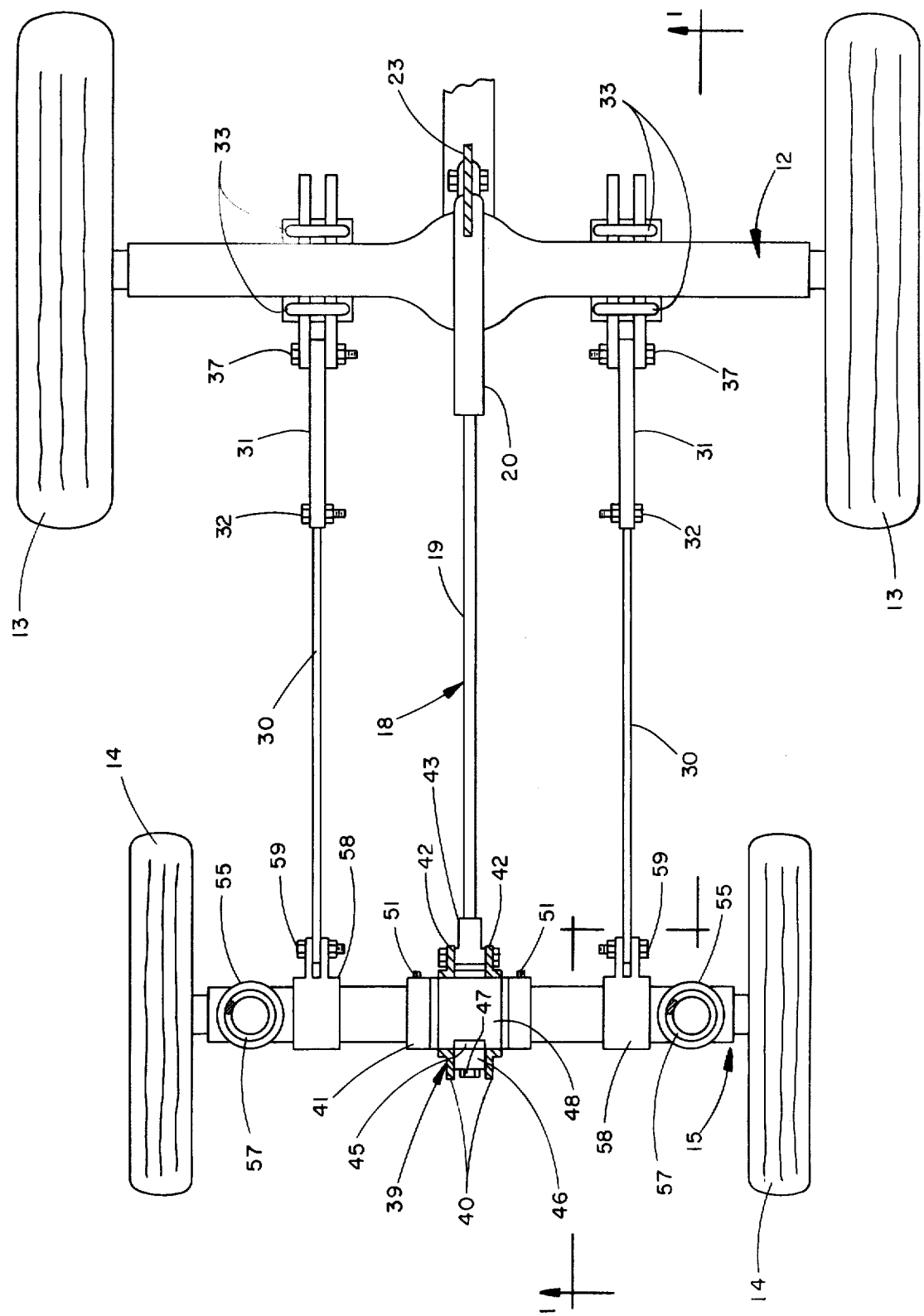
FIG. 2 is a sectional plan view taken along the lines 2—2 of FIG. 1.

While auxiliary axle 15 is normally parallel to rear axle 12 and mounting axis 16, the natural road bumps and depressions make a certain amount of yielding in this parallel alignment without lateral shifting of the auxiliary axle 15 highly desireable. Accordingly, sleeve 41 has a plate 48 welded to its topside, as illustrated in FIGS. 2 and 5. Plate 48 has a flange 45 extending upward and forward of the rear angles 40. A guide block 46 adjacent to flange 45 and riding between the rear angles 40 is rotatably fastened to flange 45 by a bolt 47 which passes loosely through guide block 46 and is secured in flange 45. In this manner, the sleeve 41, plate 48, and flange 45 can tilt within the mounting assembly 39, but will always be laterally restrained since the guide block 46 must ride longitudinally between the rear angles 40.

The actuating means ill for moving the auxiliary axle 15 and auxiliary wheels 111 between a raised and lowered position is comprised of a double acting hydraulic cylinder 18 operated from a hydraulic pump and reservoir 95 and a hydraulic control unit 97. The hydraulic pump and reservoir 95 comprises a piston movable within a cylinder and driven by a motor with a solenoid starter. Power cables 106 lead to the terminals of the lead storage battery which is standard equipment in any motor vehicle. The piston in the pump and reservoir unit 95 may be driven in either direction so that hydraulic fluid may flow either way in the hydraulic fluid lines 99 and 108 which connect the hydraulic pump and reservoir 95 with the control unit 97.

In order to move the auxiliary axle 15 to the raised position when added load carrying ability in the vehicle is not required, switch 107 in control unit 97 is forced in one direction from its neutral inactive position. This closes an electrical contact within the control unit 97 thereby activating the solenoid starter and starting the motor in the hydraulic pump and reservoir 95. The motor drives the piston therein thereby pumping hydraulic fluid from the pump and reservoir 95 toward the control unit 97 through the hydraulic line 99, and pumping hydraulic fluid from the control unit 97 to the pump and reservoir 95 through hydraulic line 108. Hydraulic fluid is supplied to line 108 from actuating hydraulic cylinder 18 by way of hydraulic line 112 and a spool valve in control unit 97 is actuated by switch 107. In the same manner, hydraulic fluid is supplied to actuating hydraulic cylinder 18 from line 99 by way of the spool valve in control unit 97 and hydraulic fluid line 21. It can be seen that as fluid flows into the actuating hydraulic cylinder 18 from line 21, the piston 19 in cylinder 18 will be forced rearward into barrel 20 and the piston 19 will act through connecting link 43 which is bolted to the forward angles 42 to rotate mounting assembly 39 counter clockwise and to draw the auxiliary axle 15 and auxilliary wheels 14 forward and upward into a load free position. The barrel 20 of actuating hydraulic cylinder 18 is connected to frame 11 through the actuating member base 24, illustrated in FIGS. 1 and 6. Barrel 20 is bolted to positioning plate 23, which is fastened to base 24 by bolts 26. Positioning plate 23 may be fastened to base 24 at a number of locations at any of the adjustment holes 25 in base 24. This allows an actuating member base of a uniform design to be used in a number of different vehicles of different size and frame configurations. To lower the auxiliary axle 15 so that the auxiliary wheels 14 are again in a load bearing position, the switch 107 is merely thrown in the opposite direction from its neutral position, and hydraulic fluid flows back from barrel 20 through line 21 to control unit 97, and from line 112 into barrel 20 thereby forcing the piston rod 19 outward, extending the actuating hydraulic cylinder, and rotating mounting assembly 39 clockwise about mounting axis 16. This clockwise rotation is continued until the center of auxiliary axle 15 passes beneath and slightly rearward of the center of mounting axis 16, where the movement of auxiliary axle 15 is limited by locking means 29.

Locking means 29 is comprised of an extensible unit on either side of the vehicle 10. Each extensible unit has a forward link 31 and a rearward link 30 in telescoping engagement. Each link 30 is attached to auxiliary axle 15 by means of a sleeve 58 and a bolt assembly 59. The forward links 31 are attached to the fastening assemblies 38 by means of bolt assemblies 37. An upper limit of extension is provided in the locking means 29 by upper limit extension locks in the form of bolts 32 passing through links 31 and passing between the rails 22 of links 30. The rails 22 of links 30 are similarly joined at both ends of each of the links 30, so that the extension of links 30 from links 31 is limited. This limit can be adjusted for the particular vehicle involved by placing the bolts 32 in other of the holes 114 in the links 31. Bolts 32 should be adjusted so that the center of auxiliary axle 15 may be moved at least beneath, and preferably to the rear of mounting axis 16. In this way, the weight of the vehicle and the load thereon prevent the mounting assembly 39 from accidently rotating in a counter clockwise direction when the suxiliary wheels 14 are in a load bearing position.

Figure 3:
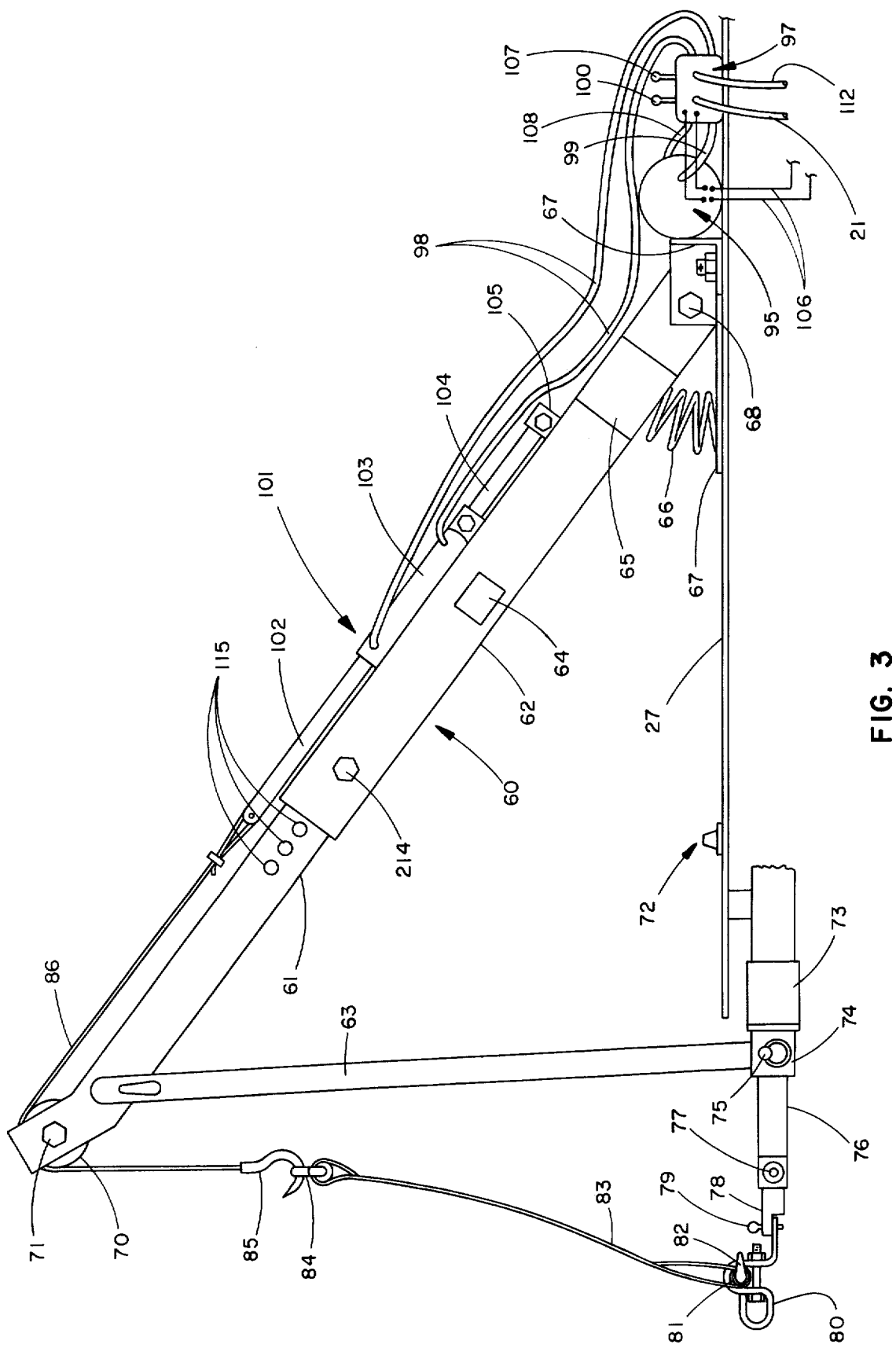
FIG. 3 is an elevational view of the collapsible towing unit of this invention.

In one application of this invention, a towing unit is attached to the vehicle frame 11 of vehicle 10 for connection to disabled vehicles and for towing such vehicles. The towing unit is attached to vehicle frame 11 by U-bolts 28 and by a welded U-shaped extension channel 73, the legs of which are bolted or welded to frame 11. The towing unit is collapsible into the floor 27 of the flat bed at the rear of the pick up truck 10. The towing unit is comprised of an extensible longitudinal beam 60 having forward and rearward telescoping sections 62 and 61 respectively. THe beam 60 of the towing unit is adjustable between the erected positions of FIG. 3 and the collapsed position of FIG. 1, with the forward section 62 attached to the vehicle frame by means of bolts 68 which pass through flanges in the supporting angle 67 and flanges at the end of forward section 62. A pulley 70 is rotatable about bolt 71 in the rearward section 61 of beam 60. The sections 61 and 62 are lockable in position by a bolt assembly 214 that passes through section 62 and through any of several pairs of holes 115 in section 61, supporting legs 63 are pivotally connected to section 61 by ball and socket joints. These legs 63 fold up against the beam 60 and are held in place by brackets 64 welded to section 62 when the beam 60 is in the collapsed position. When the beam 60 is in the erected working position, the lower ends of legs 63 are inclined to the vertical and are spread laterally from beam 60 and seated in pockets 74 of support structure 116 which is welded to the middle section of U-shaped channel 73. Fastening pins 75 extend through the walls of pockets 74 and through mating holes 69 in the legs 63 to secure the towing unit in the erected position. A towing cable 86 terminating in a hook 85 passes over pulley 70 and is connectable to a disabled vehicle when the beam 60 is in a raised position. A source of power for drawing on the towing cable 86 is provided by a double acting hoisting hydraulic cylinder 101 connected to cable 86, and by the hydraulic pump and reservoir 95 and the hydraulic control unit 97. Operation of the switch 100 on control unit 97 operates the movement of the piston rod 102 within barrel 103 of cylinder 101 by means of hydraulic lines 98 in a manner analogous to the operation of activating hydraulic cylinder 18. Hoisting cylinder 101 is secured to forward section 62 of beam 60 by means of a connecting link 104 and brackets 105 welded to section 62.

Hook 85 is engaged in an operative manner in a transverse bar 84. Heavy flexible belts 83 extend downward from either side of transverse bar 84 and are looped at their lower ends around the shank of a transverse towing bar 81. The ends of transverse towing bar 81 terminate in hooks 82 for engaging chains (not shown) which are connected to the disabled vehicle to be towed. The center of transverse towing bar 81 is joined by a center connection assembly 80 to a vertically rotatable support frame 76. Transverse towing bar 81 and assembly 80 are rotatable about a verticle axis at and are joined to support frame 76 by pivot pin 79. Support frame 76 may be lengthened or shortened by sliding the telescoping bar 78 within a sleeve 117. Bar 78 may be locked with respect to sleeve 117 by tightening friction lock 77 which is threadably engaged transversely through the wall of sleeve 117.

Figure 7:
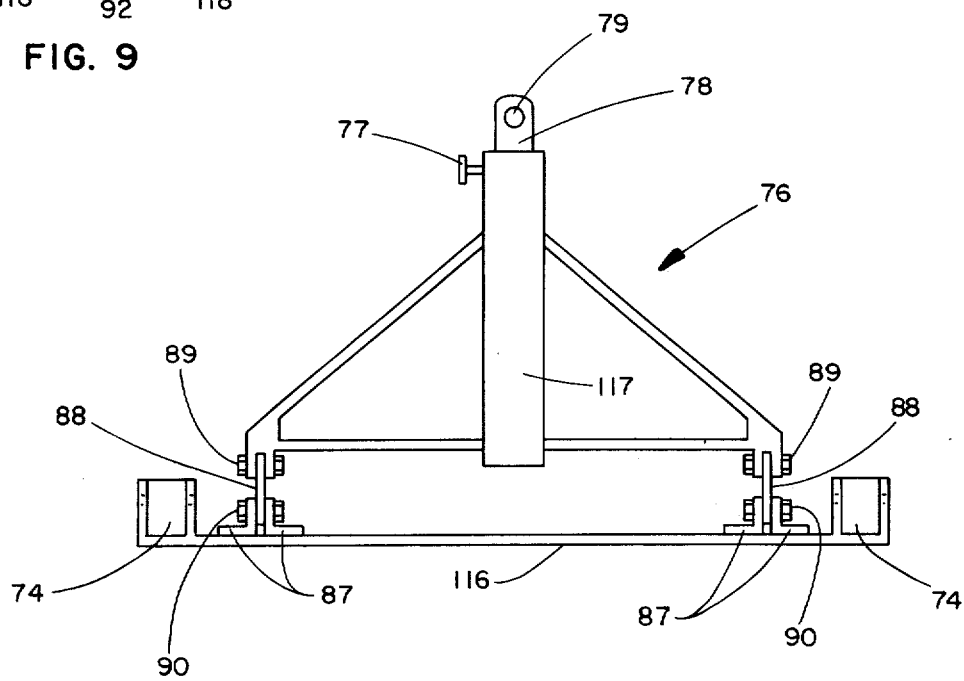
FIG. 7 is an isolated plan view of the towing support frame of FIG. 3.

As illustrated in FIG. 7, brackets 87 are welded to support structure 116 and fastened to connecting plates 88 by bolts 90. Pivot bolts 89 connect the support frame 76 to connecting plate 88.

To raise the transverse towing bar 81, and thereby raise one end of the disabled vehicle once the disabled vehicle is connected to towing bar 81, switch 100 is activated and hydraulic fluid will then flow to and from hoisting cylinder 101 through line 99 and 108. The piston rod 102 is thereby forced into barrel 103 and towing cable 86 thereby raises the transverse towing bar 81. The support frame 76 is pivoted upward about support pivots 89 until it assumes a near vertical position with the end of the disabled vehicle raised in the air so that it may be towed to its destination in the conventional manner. Using the arrangement described herein, both the actuating hydraulic cylinder and the hoisting hydraulic cylinder may be operated from a single control unit and a single hydraulic pump and reservoir means.

Three laterally aligned compression springs are interposed between alignment plate 67, fastened to floor 27, and section 62 and guides 65 extending laterally from section 62. Alignment plate 67 has 3 holes accomodating the springs 66 while the upper ends of the springs 66 extend into cavities at the underside of section 62 and guides 65. Springs 66 thereby tend to move the beam 60 into the erected position, thus minimizing the work required to bring the towing unit into a working position. A latch assembly 72 holds the beam 60 to the floor of the vehicle 10 when the towing unit is in a collapsed position.

Figure 8:
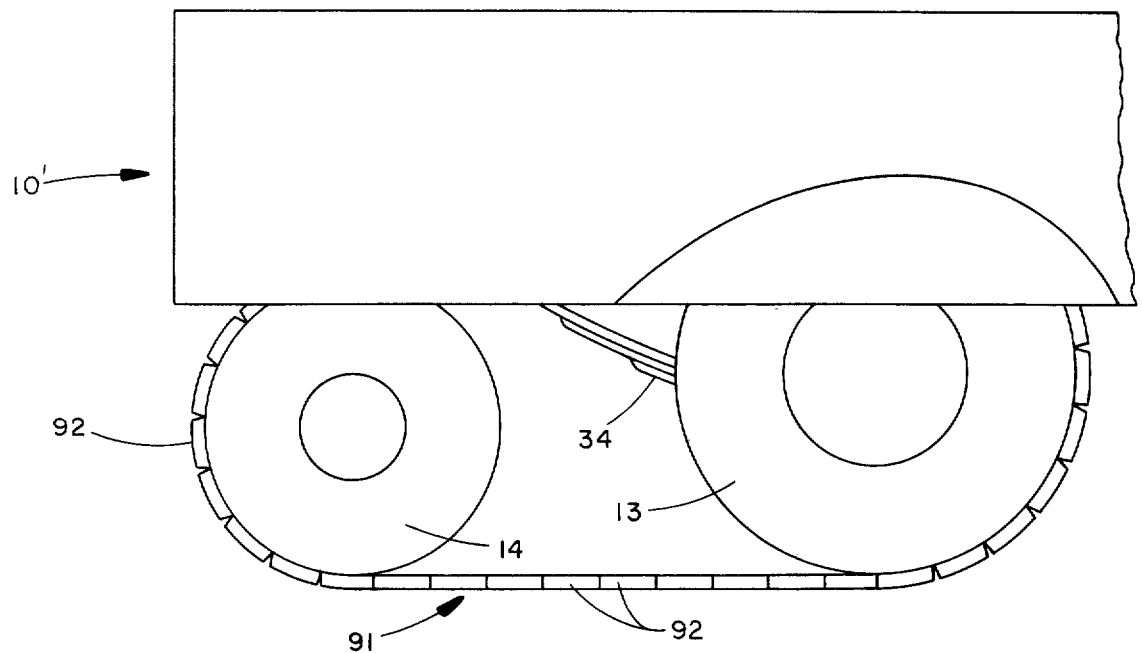
FIG. 8 is a side view of an embodiment of this invention in which a wheeled vehicle is modified for operation with a track.
Figure 9:
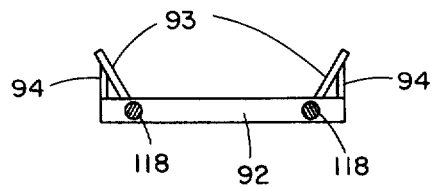
FIG. 9 is an isolated transverse view of a section of the track of FIG. 8.

A further modification of this invention is illustrated in FIGS. 8 and 9. In this embodiment, a pair of longitudinally aligned laterally constraining closed loop tracks 91 are installed on the vehicle 10. Each track 91 extends around an auxiliary wheel 14 on the auxiliary axle and around a rear wheel 13 located immediately forward thereof on the rear permanent axle. Each track 91 is constructed of a plurality of track sections 92 connected together by connecting joints 118. Each track section 92 has sloping lateral retaining walls 93 and supports 94 welded or otherwise attached on either side.

When it is desired to drive the vehicle across snowy or sandy areas where a wheeled vehicle is likely to bog down, or when the vehicle does become bogged down, the vehicle operator need merely move the auxiliary wheels 14 to the raised position and place a block or rock at the locations where the auxiliary wheel will rest when they are lowered. Alternatively a larger block or rock can be placed at the location which th auxiliary axle will assume when the auxiliary wheels are in the lowered position. The vehicle operator then lowers the auxiliary wheels which rest on the raised supports, thereby raising the rear wheels 13 of the vehicle 10' off of the ground. The vehicle operator then slips one portion of a track 91 around each rear wheel 13 and raises the auxiliary wheels 14 once again. Each track 91 can easily be made to encircle both a rear wheel 13 and the auxiliary wheel 14 on one side of the vehicle. The auxiliary wheels are again lowered, thereby stretching taut the tracks 91 and allowing the rear wheels 13 to drive the tracks 91 thereby propelling the vehicle. When the services of a tracked vehicle are no longer required, a reverse procedure is followed to remove the tracks 91.

The detailed descriptions of embodiments of this invention have been given for illustration purposes only, and no unecessary limitations should be constructed therefrom as other applications and modifications will become readily apparent to those familiar with heavy duty vehicles.

I claim as my invention

1. In a motor vehicle having a frame with a towing unit attached to the frame for connection to disabled vehicles for towing the same and having permanent front and rear axles and designed for operation with only two permanent parallel axles and supported by wheels on the ends of said permanent axles, the improvement comprising a mounting assembly rotatably connected to the vehicle frame behind the rear axle for rotation about a mounting axis above and to the rear of said rear axle, an auxiliary axle with auxiliary wheels mounted on the ends thereof carried by said mounting assembly and rotatable about said mounting axis between a lowered, load bearing position at the underside of said vehicle and a raised, load free position at the underside of said vehicle and forward of said mounting axis, actuating means in the form of a double acting hydraulic cylinder connected to the vehicle frame and to the mounting means and operated from a hydraulic pump and reservoir means through a hydraulic control unit for moving the auxiliary axle between the lowered and raised positions, and locking means for locking the auxiliary axle in the lowered, load bearing position.

2. In a motor vehicle having a vehicle frame with a towing unit attached thereto for connection to disabled vehicles for purposes of towing such disabled vehicles and having permanent front and rear axles and designed for operation with only two permanent axles and supported by wheels on the ends of said permanet axles, the improvement comprising a mounting assembly rotatably connected to the vehicle frame behind the rear axle for rotation about a mounting axis located above and to the rear of said rear axle, an auxiliary axle with auxiliary wheels mounted on the ends thereof carried by said mounting assembly and rotatable about said mounting axis between a lowered, load bearing position at the underside of said vehicle and a raised, load free position at the underside of said vehicle and forward of said mounting axis, actuating means connected to said vehicle frame and to said mounting means for moving said auxiliary axle between said lowered and raised positions, and locking means for locking said auxiliary axle in said lowered, load bearing position.

3. The motor vehicle of claim 2 wherein said motor vehicle is a pick up truck having a flat bed at the rear thereof, and said towing unit is collapsible onto said flat bed.

4. The motor vehicle of claim 3 wherein said towing unit is comprised of a longitudinal beam having forward and rearward sections and adjustable between an erected and a collapsed position with said forward sections attached to said vehicle frame, a pulley attached to said rearward section of said beam, supporting legs pivotally connected to said rearward section of said beam and seatable with respect to said vehicle frame in laterally and vertically supporting positions when said beam is in the afore said erected position, a longitudinal towing cable passing over said pulley and connectable to a disabled vehicle when said beam is in a raised position, and a power source for drawing on said towing cable.

5. The motor vehicle of claim 2 wherein said auxiliary axle is spring biased away from said mounting axis.

6. The motor vehicle of claim 2 wherein said actuating means comprises a double acting hydraulic cylinder operated from a hydraulic pump and reservoir means through a hydraulic control unit.

7. The motor vehicle of claim 2 wherein said locking means is comprised of an extensible unit connected to said auxiliary axle and to said vehicle forward of said auxiliary axle, and an upper limit extension lock in said extensible unit allows said extensible unit to extend to allow said mounting means to rotate rearward with the center of said auxiliary axle passing rearward of the mounting axis.

8. In a pickup truck having a flat bed at the rear thereof and a frame with permanent front and rear axles and designed for operation with only two permanent parallel axles and supported by wheels on the ends of said permanent axles, the improvement comprising a towing unit attached to the vehicle frame and located on said flat bed and comprised of an extensible, longitudinal beam having forward and rearward sections and adjustable between an erected position and a position collapsed onto said flat bed with said forward section attached to said vehicle frame, springs compressed between said beam and said flat bed tending to move said bean to said erected position, a pulley attached to said rearward section of said beam, supporting legs pivotally connected to said rearward section of said beam and seatable with respect to said vehicle frame in laterally and vertically supporting positions when said beam is in the aforesaid erected position, a longitudinal towing cable passing over said pulley and connectable to a disabled vehicle when said beam is in an erected position, and a power source formed of a double acting hoisting hydraulic cylinder operated from a hydraulic pump and reservoir means through a hydraulic control unit for drawing on said towing cable, and also comprising a mounting assembly rotatably connected to the vehicle frame behind the rear axle for rotation about a mounting axis to the rear of said rear axle, an auxiliary axle with auxiliary wheels mounted on the ends thereof carried by said mounting assembly and rotatable about said mounting axis between a lowered, load bearing position and a raised, load free position, actuating means connected to said vehicle frame and to said mounting means for moving said ausiliary axle between said lowered and raised positions, and locking means for locking said auxiliary axle in said lowered, load bearing position.

* * * * *